US00RE34884E

United States Patent [19]

Coleman

[11] E Patent Number: Re. 34,884

[45] Reissued Date of Patent: Mar. 28, 1995

[54] LAMINATED SIGN

[76] Inventor: Kelly R. Coleman, 516 Belle Isle Ave., Belleair Beach, Fla. 34635

[21] Appl. No.: 53,270

[22] Filed: Apr. 28, 1993

Related U.S. Patent Documents

Reissue of:

[64] Patent No.: 5,010,672
Issued: Apr. 30, 1991
Appl. No.: 161,688
Filed: Feb. 29, 1988

[51] Int. Cl.[6] ..... G09F 19/00

[52] U.S. Cl. ..... 40/615; 40/584

[58] Field of Search ..... 40/615, 584, 616, 626, 40/630; 156/100, 103, 312; 428/13, 187

[56] References Cited

U.S. PATENT DOCUMENTS

| | | | |
|---|---|---|---|
| 2,039,998 | 5/1936 | Hollister | 40/615 |
| 2,867,053 | 1/1959 | Boor | 40/615 |
| 3,205,118 | 9/1965 | Guffan | 428/187 X |
| 3,386,199 | 6/1968 | Nagatsuka | 40/615 |
| 3,494,056 | 2/1970 | Elzer | 40/299 |
| 3,570,159 | 3/1971 | Burgener, Jr. et al. | 40/615 |
| 3,751,319 | 8/1973 | Green et al. | 156/242 |
| 3,997,991 | 12/1976 | Hayman-Chaffy et al. | 40/135 |
| 4,192,091 | 3/1980 | Hawes | 40/615 |
| 4,197,151 | 4/1980 | Muzik | 156/249 |
| 4,337,590 | 7/1982 | Jackson | 40/615 |
| 4,500,374 | 2/1985 | Nakazima | 156/83 |
| 4,716,672 | 1/1988 | Arakawa | 40/615 |

*Primary Examiner*—Cary E. O'Connor
*Attorney, Agent, or Firm*—Edwin E. Greigg; Ronald E. Greigg

[57] ABSTRACT

A sign and process of making a sign which comprises applying vinyl graphics to a backside of a substrate by use of high pressure rollers laminating machine or squeegee and covering the back side of the substrate and graphics by a backing sheet. The graphics and backing sheet may be applied by a laminating machine or squeegee and secured in place by a self-adhesive. Applying the laminated film on the reverse side has a protection quality that a silk screened or spray painted face does not have since the vinyl protects the rear side of the face against scratching during installation of the face and/or transportation of the sign.

9 Claims, 1 Drawing Sheet

LAMINATED SIGN

Matter enclosed in heavy brackets [ ] appears in the original patent but forms no part of this reissue specification; matter printed in italics indicates the additions made by reissue.

BACKGROUND OF THE INVENTION

This invention relates to a method and means of forming signs and more particularly to a sign in which the graphics viewed are protected from ultraviolet light and the weather.

Heretofore, signs have been made in which the graphics have been applied to the face of the sign and as such is exposed to the weather and ultraviolet light. It has also been known to make signs with externally or internally applied silk screen paint process. Such silk screen processes have been covered by a background covering. Known prior art related to the invention are found in U.S. Pat. Nos. 3,309,804; 3,494,056; 3,751,319; 3,797,147; 3,959,906; 4,197,151; 4,479,319; and 4,604,153. Of the patents listed U.S. Pat. No. 3,494,056 to Elzer is believed to be the closest to the present invention. In Elzer, the graphics are silk screened directly onto a substrate by reverse printing. Then a background is painted over the silk screen graphics. A backing paper is then adhered to the graphics and background.

OBJECT AND SUMMARY OF THE INVENTION

This invention is directed to a process and article made by the process which results in a more even control unifying of colors, it guarantees evenness of color because the graphics etc., are created and applied by a machine as opposed to creation and application by a person.

It is therefore an object of the invention to provide a sign which is viewed through the facing to which the graphics and background have been applied a mechanical process or preformed and applied to the facing.

Another object is to provide a sign which has greater clarity because the graphics and background are not subject to weather conditions and any air normally trapped in front of the graphics is omitted by application of the lettering.

The invention will be better understood an further objects and advantages thereof will become more apparent from the ensuring detailed description of preferred embodiments taken in conjunction with the drawings.

DETAILED DESCRIPTION

Figure 1:
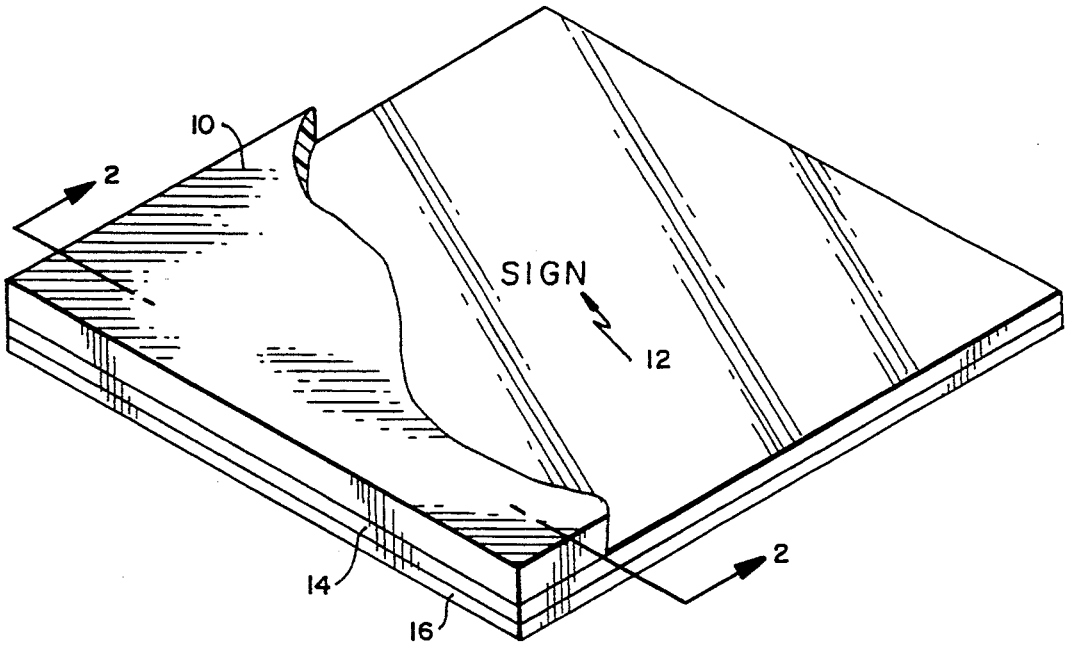
FIG. 1 illustrates the parts of a sign made in accordance with the process.
Figure 2:
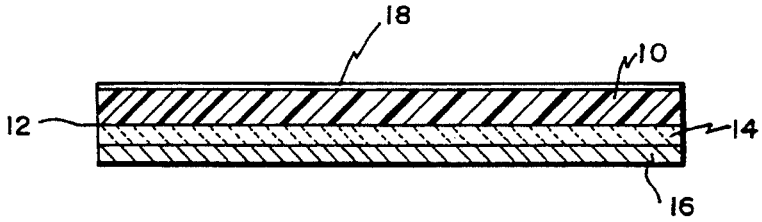
FIG. 2 is a cross sectional view of a sign shown in FIG. 1, further illustrating a protective covering.

Now referring to the drawing, there is shown a sign made in accordance with the process of this invention. FIG. 1 illustrates a sign facing 10 made of a transparent material which may be flexible or rigid. Suitable materials may be LEXAN, ACRYLIC or PVC reinforced with fiberglass or nylon as well as, other transparent materials. The graphics 12 represented by the word SIGN is silk screened or otherwise applied to a thin translucent vinyl sheet 14 such as by being silk screened on a vinyl, then applied to the facing or they may be cut out of silk screened or pigmented vinyl and applied to the facing and then laminated with a clear or colored film. Or graphics may be cut out of silk screened or translucent material and applied to a thin or clear translucent vinyl and then applied to the facing. The graphics may be applied to the front side of the vinyl sheet by normal lettering or onto the back side of the vinyl sheet by reverse lettering. The graphics are then cut out to form individual letters which are then pressed onto the facing by a roller or squeegee which presses any air from between the vinyl sheet and the facing. A self-adhesive film may be applied to the back side of the facing to which the vinyl is secured or a self-adhesive film may be on the facing of the letters that are pressed against the facing.

Once the graphics have been pressed in place, the entire back of the facing is overlaminated with another translucent silk screen or colored film 16, that provides background for the graphics. The backing film has a self-adhesive or applied adhesive on the side adhering to the facing and over the graphics. It would also be obvious to have the adhesive on the back side of the facing and backside of the vinyl-graphic letters to which the backing film is secured. The backing sheet is also rolled onto the facing. For such an application, a laminating machine roller or squeegee may be used.

In mass production, the graphics could be silk screened onto a vinyl and then rolled into a roll from which sections of graphics are removed for separate signs. Also, the background sheet may be obtained from a pre-silk screened roll of [vinYl] *vinyl* which may then be placed in a laminating machine and laminated in place upon a facing with the graphics thereon.

It is not necessary that a clear vinyl be used upon which a background is silk screened or otherwise applied since materials are made which are colored through their thickness as the film is made. Such film may also be used for the backing film. The important feature is that the graphics and backing sheet are applied by a roller or squeegee onto the facing with the backing sheet laminated in place.

One of the problems encountered with present day signs is discoloration due to ultraviolet light. In the process of this invention there are at least two layers through which the ultraviolet light must travel, that is, the facing and the vinyl sheet from which the graphics are formed. By rolling the graphics and backing sheet in place, all of the air is displaced from between the layers and by enclosing the graphics in a backing sheet, no moisture can get to the graphics. Therefore, the graphics are encased within an enclosure which protects the graphics from the elements and from the ultraviolet light. It has been determined that high pressure rolling the graphic letters and backing sheet will prevent stretching which usually happens during a squeegee operation or during power or manual application.

It has been determined that LEXAN manufactured by General Electric will fade due to ultraviolet light. Therefore, a clear coating 18 which blocks ultraviolet light may be applied to the front surface of a LEXAN facing to prevent fading due to ultraviolet light.

The graphics and background may be formed by use of a clear vinyl film to which silk screened color and/or graphics, or pigmented vinyl color may be added. The graphics are cut from the vinyl sheet and applied to the facing. Also, the thin vinyl to which the graphics have been applied may be cut to include the composite graphic display and applied to the facing.

Rather than using a backing sheet on which a background has been formed by some means such as painting, spray, coating or silk screening, the backing sheet may be omitted and the graphics and backside of the facing is covered by applying a suitable translucent paint film or coating by spray application, roller coating or silk screen method.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A sign which comprises:

a [flexible] *transparent* facing *sheet* including a first and a second surface and having an overall dimension of said sign;

a thin [flexible sheet] *graphics* having a first side and a second side, *said* graphics applied onto said second [side] *surface* of said [thin flexible] *transparent facing* sheet[,] *with* said first side of said thin [flexible sheet] *graphics* being secured onto said second surface of said [flexible] *transparent* facing *sheet* by adhesive means; and a protective covering backing sheet [of thin vinyl] including a first surface and a second surface, said first surface of said protective backing sheet being applied over said [thin flexible sheet] *second side of said graphics* and secured to said second [side] *surface* of said [thin flexible] *transparent facing* sheet [and a secured to a portion of said second surface of said flexible facing] by adhesive means to protect said graphics, whereupon said sign may be installed in a special frame allowing said graphics to be viewed only through said first [side] *surface* of said [flexible] *transparent* facing *sheet*, and a protective coating of a material applied onto [said first] *one* surface of said facing *sheet* which blocks ultraviolet light, whereby ultraviolet light that is harmful to graphics will pass through at least two thicknesses of material for protection of said graphics from the ultraviolet light.

2. A sign as set forth in claim 1, in which said *protective* covering *backing sheet* is a thin vinyl sheet [including a background color] which is applied over said graphics and the second surface of said facing by use of an adhesive.

3. A sign as set forth in claim 1, in which said adhesive means further comprises a self-adhesive applied to said second surface of said facing *sheet.*

4. A sign as set forth in claim 1, in which said adhesive means comprises a self-adhesive applied onto said [first side] *second surface* of said [thin flexible] *transparent facing* sheet [including] *that includes* said graphics and onto said first surface of said *protective covering* backing sheet.

5. A sign as set forth in claim 1, in which:

said [thin flexible] *transparent facing* sheet is [vinyl] *selected from a group consisting of LEXAN or ACRYLIC* to which said graphics have been applied [by a silk screen process]; and said *protective covering* backing sheet includes a *translucent* background [applied by a silk screen process].

[6. A sign as set forth in claim 1, in which said facing is translucent and selected from the group consisting of polycarbonate, or ACRyLIC or PVC reinforced with woven fiberglass, or nylon.]

7. A sign as set forth in claim 1, in which said [thin flexible sheet has] *graphics have* dimensions smaller than said [flexible] *transparent* facing *sheet.*

*8. A sign as set forth in claim 1, in which said transparent facing sheet is selected from the group consisitng of ACRYLIC, LEXAN, or PVC reinforced with fiberglass or nylon.*

*9. A sign as set forth in claim 1, in which said ultraviolet light blocking protective coating is applied onto said first surface of said transparent facing sheet.*

*10. A sign as set forth in claim 1, in which said facing sheet is formed of a rigid material.*

* * * * *